United States Patent Office.

WILLIAM B. MOORE, OF WINCHESTER, MISSOURI.

Letters Patent No. 70,737, dated November 12, 1867.

IMPROVED PRESERVATIVE BLACKING FOR LEATHER.

The Schedule referred to in these Letters Patent and making part of the same.

TO ALL WHOM IT MAY CONCERN:

Be it known that I, WILLIAM B. MOORE, of Winchester, in the county of Clark, and in the State of Missouri, have invented a new and improved Blacking and Leather-Preservative; and I do hereby declare that the following is a full, clear, and exact description thereof.

The object of my invention is to produce a superior blacking and preservative for boots, shoes, harness, &c., which shall give a good polish, and at the same time close the pores, strengthen the fibre, and render the leather soft, elastic, and water-proof; and the nature of my invention consists in compounding the following-named articles substantially as described:

First take one ounce of gum-shellac and dissolve it in about two ounces of hot water; one ounce of gum-arabic, with water sufficient to dissolve it; four ounces extract of logwood, with water sufficient to dissolve it; three ounces of wheat flour made into a thin paste with water; two ounces molasses; three ounces fish oil; four ounces beef-tallow; one and a half ounce gum-guaiacum finely powdered. Put all the above-named ingredients into an iron vessel, which place over a moderate heat, and stir until they are thoroughly incorporated.

Next take one ounce nut-gall finely powdered; one ounce muriate tincture iron; one ounce olive oil, and two ounces alcohol. Mix, and add the compound thus formed to the former while it is hot, and stir until it is cool, when it may be packed into boxes, and is ready for use.

This blacking and preservative may be applied with a knife-blade so as to form a thin coat over the leather, or it may be applied with a brush, and polished by the application of friction in the usual way.

I claim for my blacking the following superior qualities: It strengthens the fibre of the leather, closes up the pores, renders it soft, elastic, and water-proof, and is susceptible of a fine polish.

What I claim as new, and desire to secure by Letters Patent, is—

A blacking and leather-preservative composed of the ingredients hereinbefore named, and compounded in the manner and in the proportions substantially as described.

In testimony that I claim the above-described boot, shoe, and harness-blacking, I have hereunto signed my name this    day of    , 1867.

WILLIAM B. MOORE.

Witnesses:
GEORGE MANSPERGER,
SOLOMON CHANNEL.